UNITED STATES PATENT OFFICE.

ALFRED B. MERRY, OF SPRINGFIELD, MASSACHUSETTS, ASSIGNOR TO THE COTT-A-LAP COMPANY, OF SOMERVILLE, NEW JERSEY, A CORPORATION OF NEW JERSEY.

PREPARATION OF INGREDIENTS FOR THE PRODUCTION OF COLORED CALCIMINES.

1,247,128. Specification of Letters Patent. Patented Nov. 20, 1917.

No Drawing. Application filed March 27, 1914, Serial No. 827,613. Renewed October 1, 1917. Serial No. 194,284.

*To all whom it may concern:*

Be it known that I, ALFRED B. MERRY, a citizen of the United States, and a resident of Springfield, in the county of Hampden and Commonwealth of Massachusetts, have invented certain new and useful Improvements in Preparations of Ingredients for the Production of Colored Calcimines, of which the following is a specification.

My invention relates to colored calcimines, and has for its object to prepare and preserve the ingredients of colored calcimines in such a way that they will not deteriorate as readily as the usual colored calcimines, and also with a view of reducing the stock which a jobber, dealer, or decorator will have to keep on hand in order to meet the demand for different colors (hues) or tints. According to my invention, the ingredients of the colored calcimine are prepared in two separate masses of measured amounts, or "units," to wit, a body substance formed or put up in measured quantities or "body units," and a number of coloring substances also in measured quantities or "color units." While all body units prepared according to my invention are supposed to be alike both in composition and in amount, the color units would differ not only as to their composition (so as to produce different colors), but some of them also as to amount, so as to produce different tints of the same color. This feature of having color units of different amounts for the production of different tints of the same color, is however not essential to all forms of my present invention. Preferably, the body units as well as the color units are made in dry (solid) form, as distinguished from liquid or semi-liquid (paste-like) ingredients, and in particular, there are certain advantages to be obtained, as more fully set forth hereinafter, by employing the solid units, and particularly the color units, in coherent form, such as blocks or tablets. In any event, the use of my invention will enable various tints and colors of great uniformity to be produced readily, without requiring any special skill. I also generally provide a chart showing the various tints and hues which will be obtained by using my body units in conjunction with various color units.

In detail, I may proceed as follows: As a calcimine body, I may use any suitable calcimine body which is white or nearly so, many of the mixtures now on the market being suitable for the purposes of my invention; in fact, almost every good calcimine body will answer. I may mention the calcimine body produced according to Moore's United States Letters Patent No. 488,024 as an example of the many compositions suitable for use as a calcimine body in my invention, it being understood that my present invention does not relate to the particular composition of the calcimine body. This calcimine body (generally consisting of one or more pigments, say whiting, and a binder, say glue) is put up in cans, envelops, bags, or other suitable containers, preferably dry, that is, the calcimine body is solid and not liquid or even pasty. The dry calcimine body is thus put up in measured quantities, say in amounts of 1000 grams each, and these measured quantities of calcimine body I term the body units.

Furthermore I provide, preferably also as dry solid material, color units of a suitable character. All materials of the calcimine should be ground to a very fine state of subdivision, but my invention is not restricted to the use of any particular coloring materials. As examples of coloring materials suitable for the purposes of my invention, I will mention ultramarine for blue, lead chromate for yellow, and crimson lake for red; these three colors may be sufficient to produce all the tints and hues desired. I may use other pigments, such as chrome green, carbon black, etc., but, as stated above, the exact nature of the coloring material is not the subject of my present invention. Whatever be the nature of the coloring material used, each is separated into color units of definite amount (weight) and coloring strength. These color units might be put up in the form of coherent bodies, as solid blocks or tablets, compressed in tablet-molding machines of any approved character, and these color units, when in coherent masses, might be kept together in the same container even though such units differ in color, or the coherent color units might even be kept without any container. If the color units are not coherent, say if they are kept as powders, suitable containers, as bags, envelops, cans, or capsules would be required for the individual color units. In any event, the color units would be of uniform and accurately measured quantities, which would always be much smaller than those of the body units. For instance, to produce the lightest shade of blue in connection with one of the body units, I might have blue (say, ultramarine) color units of one gram each; to produce the next shade of blue, I might have blue color units of two grams each, and so on. For each tint or hue to be produced, I would have a special color unit. Color units of like constitution, but of different weight or amount, would be employed for producing different tints of the same hue or color, while for producing different colors, I would employ color units of different materials or at least differing in the proportions of the materials, in the case of color units containing two or more coloring materials.

With the units described above, I would supply a chart showing the exact tints and hues or colors obtainable by using each of the particular color units in conjunction with one of the body units. The chart would thus give specific and unmistable directions for producing each color or tint, that is to say, the chart would indicate what color unit was to be taken in conjunction with a body unit to produce each of the hues or tints shown on the chart. Portions of such chart might be fastened to the packages containing the color units.

The method of using the new calcimine is as follows: For an ordinary ceiling 1 kilogram of dry calcimine is usually sufficient. If the calcimine body units are of 1 kilogram each, the workman will take with him one of the calcimine body units and an assortment of color units. Since the latter are of high coloring power, they will be very small, only a gram or two apiece, so that it will be easy for the workman to carry with him a large assortment of color units, or even a complete assortment. From the chart brought by the workman, the customer would select the desired tint or color, and the workman would then read off from the chart, the exact "formula" of such tint or color, that is to say, the kind of color unit to be employed. The color unit might be disintegrated first in water, and then mixed with the body unit; or the body unit might be mixed first with slightly less than the required quantity of water, and thoroughly distributed therein, the color unit being similarly mixed with water and distributed therein, whereupon the two liquids would be poured together and stirred. The total amount of water might be, say 1½ liters to each kilogram of calcimine. The calcimine, after being brought to liquid form as just described, would be applied in the usual way.

It will be understood, however, that until shortly before actual use for calcimining, the body units and color units would be kept separate from each other, thereby avoiding all danger of any detrimental interaction between the body ingredients and the color materials. The use of measured quantities is a valuable feature as it dispenses with the necessity of weighing or measuring ingredients before putting them together, so far as the user of my improved calcimine is concerned. It also insures uniform results, even when portions of the work must be done at different times. The fact that only one kind of body unit is provided for all the tints or colors, reduces not only the weight of material which the workman is required to carry, but is of even greater importance in reducing the amount of merchandise which the jobber or dealer will have to keep in stock. These advantages are secured in a still higher degree when the materials are kept in solid, dry form, that is to say, not liquid or semiliquid; for in this case the weight of the liquid is eliminated, and incidentally a further advantage is secured by the resulting saving in freight charges. The use of the units in dry, solid form further minimizes or eliminates entirely, the danger of noxious interaction between the material of the container and the ingredients of the body units or color units; besides, solid units can be kept in paper bags or other cheap containers which would be quite unsuitable with ingredients of a liquid or moist nature. Furthermore, if the color units are made in the form of tablets or other coherent masses, it will not be necessary to provide a separate container for each color unit, since color units of different kinds might then be kept in the same container, or the coherent color units, particularly in the form of compressed tablets, might be kept without any container whatever.

From the above explanations it will be understood that my invention offers very important advantages as regards the preserving of the calcimine ingredients, the preparation of the calcimine for use, the perfect matching of portions of the same work done at different times, and the storing and shipment of the ingredients, whereby excellent results may be obtained at a reduced cost, without requiring any unusual skill.

Various modifications may be made without departing from the nature of my invention.

I claim as my invention:

1. The method of producing colored calcimine, which consists in preparing accurately determined amounts or units of a calcimine body material, separately preparing accurately determined amounts of coloring matter or color units, and bringing such body units and color units together shortly before the time of intended use.

2. The method of preparing and preserving for use, ingredients suitable for the production of colored calcimine, which consists in preparing calcimine body units in dry form, separately preparing, also in dry form, color units of different colors, and keeping both the body units and the color units in such dry form until immediately before using them.

3. The method of preparing and preserving for use, ingredients suitable for the production of colored calcimine, which consists in preparing calcimine body units of uniform weight, separately preparing color units differing as to color and also as to amount, and keeping such body units separate from the color units until shortly before the use of the calcimine.

4. The method of preparing and preserving for use, ingredients suitable for the production of colored calcimine, which consists in preparing calcimine body units, separately preparing color units in solid coherent form, and keeping the body units separate from the color units until shortly before the use of the calcimine.

5. The method of preparing and preserving for use, ingredients suitable for the production of colored calcimine, which consists in preparing calcimine body units, separately preparing color units in the form of solid tablets, and keeping the body units separate from the color units until shortly before the use of the calcimine.

In testimony whereof, I have signed this specification in the presence of two subscribing witnesses.

ALFRED B. MERRY.

Witnesses:
 DORIS V. MERRY,
 MAY MERRY.